(12) United States Patent
Ito (10) Patent No.: US 9,895,859 B2
(45) Date of Patent: Feb. 20, 2018

(54) TWO-COLOR MOLDING METHOD AND TWO-COLOR MOLDED ARTICLE

(71) Applicant: Koito Manufacturing Co., Ltd., Tokyo (JP)

(72) Inventor: Hiroya Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 155 days.

(21) Appl. No.: 14/688,295

(22) Filed: Apr. 16, 2015

(65) Prior Publication Data

US 2015/0306838 A1    Oct. 29, 2015

(30) Foreign Application Priority Data

Apr. 23, 2014  (JP) ................................. 2014-089122

(51) Int. Cl.
   *B32B 3/04*     (2006.01)
   *F21S 8/10*     (2006.01)
   (Continued)

(52) U.S. Cl.
   CPC ............... *B32B 3/04* (2013.01); *B29C 45/16* (2013.01); *F21S 48/1233* (2013.01);
   (Continued)

(58) Field of Classification Search
   CPC . B29C 45/0062; B29C 45/1615; B29C 45/16; B29C 45/1617; B29C 45/1679;
   (Continued)

(56) References Cited

U.S. PATENT DOCUMENTS 5,721,039 A * 2/1998 Yanagihara ........... B29C 45/062
                                                       359/642
6,244,653 B1 * 6/2001 Nishio .................... B29C 45/16
                                                       296/201

(Continued)

FOREIGN PATENT DOCUMENTS

CN      101905510 A     12/2010
JP      2011-187299 A    9/2011

OTHER PUBLICATIONS

Office Action dated Nov. 18, 2016, issued from the Chinese State Intellectual Property Office of the P.R.C. (SIPO) of Chinese Patent Application No. 201510192543.2 and a EN translation thereof.

*Primary Examiner* — Jeffrey Wollschlager
(74) *Attorney, Agent, or Firm* — Abelman, Frayne & Schwab (57) ABSTRACT

Provided are a two-color molding method, and a two-color molded article capable of suppressing deterioration of the appearance quality which is caused by resin shrinkage or resin deformation in the two-color molding. The two-color molding method includes: molding a first resin portion by a common die and a primary die; and molding a second resin portion integrally with the first resin portion by the common die and a secondary die. An abutting portion is molded on an edge of the first resin portion to protrude toward the secondary die when the first resin portion is molded, and a distal end surface of the abutting portion is maintained to be abutted on a cavity surface or a parting surface of the secondary die when the second resin portion is molded. The deformation of the abutting portion or the first resin portion is suppressed to suitably mold the second resin portion.

5 Claims, 9 Drawing Sheets

(51) Int. Cl.
*B29C 45/16* (2006.01)
*B29D 11/00* (2006.01)
*B29C 45/00* (2006.01)
*B29C 45/18* (2006.01)

(52) U.S. Cl.
CPC ...... *B29C 45/0025* (2013.01); *B29C 45/0062* (2013.01); *B29C 45/1615* (2013.01); *B29C 45/1675* (2013.01); *B29C 45/1676* (2013.01); *B29C 45/1679* (2013.01); *B29C 45/1816* (2013.01); *B29C 45/1866* (2013.01); *B29C 2045/0089* (2013.01); *B29C 2045/1682* (2013.01); *B29D 11/0073* (2013.01); *B29K 2995/0025* (2013.01); *B29K 2995/0026* (2013.01); *B32B 2605/00* (2013.01)

(58) Field of Classification Search
CPC ............ B29C 45/1635; B29C 45/1639; B29C 2045/1682; B29C 45/0025; B29C 2045/0089; B29C 45/1816; B29C 45/1866; B29C 45/1675; B29C 45/1676; B32B 3/04; B32B 2605/00; F21S 48/1233; B29K 2995/0025; B29K 2995/0026; B29D 11/0073
See application file for complete search history.

(56) References Cited

U.S. PATENT DOCUMENTS

| | | | | |
|---|---|---|---|---|
| 2004/0218024 A1* | 11/2004 | Hankins | ................... | B29C 66/55 347/86 |
| 2006/0012749 A1* | 1/2006 | Ai | ........................... | B29C 45/16 351/158 |
| 2006/0062967 A1* | 3/2006 | Summerer | ............ | B29C 45/045 428/157 |
| 2006/0076710 A1* | 4/2006 | Rossanese | .............. | B29C 45/16 264/255 |
| 2006/0284336 A1* | 12/2006 | Cipkar | ................ | B29C 45/1635 264/255 |
| 2007/0018354 A1* | 1/2007 | Bazzo | ................. | B29C 45/1635 264/255 |
| 2007/0196626 A1* | 8/2007 | Summerer | ........ | B29C 45/14065 428/192 |
| 2009/0317648 A1* | 12/2009 | Kong | ................... | B29C 45/1635 428/515 |
| 2011/0180294 A1* | 7/2011 | Qin | ......................... | B29C 45/06 174/50 |
| 2011/0182017 A1* | 7/2011 | Kang | .................. | B29C 45/1675 361/679.21 |
| 2013/0095287 A1* | 4/2013 | Suzuki | ................ | B29C 45/1657 428/136 |
| 2014/0314901 A1* | 10/2014 | Takaoka | .............. | B29C 45/1635 425/577 |

* cited by examiner

TWO-COLOR MOLDING METHOD AND TWO-COLOR MOLDED ARTICLE

CROSS-REFERENCE TO RELATED APPLICATIONS

This application is based on and claims priority from Japanese Patent Application No. 2014-089122, filed on Apr. 23, 2014, with the Japan Patent Office, the disclosure of which is incorporated herein in its entirety by reference.

TECHNICAL FIELD

The disclosure relates to a so-called two-color molding technique of integrally molding different resins, and particularly to a two-color molding method suitable for manufacturing a light transmitting body which is one of components of a lamp, and a two-color molded article molded by the two-color molding method.

BACKGROUND

In a lamp, such as, for example, a headlamp of a vehicle, a front cover of a lamp housing accommodating a lamp unit is made of a light transmitting resin, and light emitted from the lamp unit is transmitted through the front cover to illuminate the front area of the vehicle in a required light distribution. In the front cover, an effective portion, that is, a region through which the light is transmitted, is molded of a light transmitting resin only. However, an ineffective portion which does not contribute to the light distribution is molded of a colored non-light transmitting resin so that the inside of the lamp housing is optically shielded. Thus, a part of the inside of the lamp is not visible from the outside to improve the beauty of the external appearance. In many cases, such a front cover is molded by a two-color molding method using a light transmitting resin and a non-light transmitting resin as disclosed in Japanese Patent Laid-Open Publication No. 2011-187299.

In the two-color molding method, a cavity is formed using a common die and a primary die, and a first resin is injected into the cavity to mold a first resin portion. Subsequently, the primary die is replaced with a secondary die while the first resin portion is held in the common die, and a second resin is injected into a cavity newly formed using the common die and the secondary die to mold a second resin portion so that a two-color molded article, in which the first resin portion and the second resin portion are integrated with each other is fabricated.

SUMMARY

When the front cover described above is molded using the two-color molding, a two-color molding method is generally employed in which a non-light transmitting resin portion is molded using a common die and a primary die, and then, a light transmitting resin portion is molded using the common die and a secondary die. An undercut portion is formed in the non-light transmitting resin portion. Thus, a slider for molding the undercut is mounted in the common die and the non-light transmitting resin portion is molded using the common die and the primary die. Further, the light transmitting resin portion is molded integrally with the previously molded non-light transmitting resin portion using the common die and the secondary die.

However, as will be described below in detail, there has also been suggested a two-color molding method, in which a die not provided with a slider is employed as a common die in order to improve the molding quality of a light transmitting resin portion. In the two-color molding method, first, a light transmitting resin portion is molded using a common die and a primary die, and then, a non-light transmitting resin portion is molded using the common die and a secondary die provided with a slider. According to the two-color molding method, a slide line is not formed in the light transmitting resin portion by the slider, and thus, the appearance quality of the front cover may be improved.

However, when the two-color molding method is employed, there is a problem in that a resin shrinkage or a resin deformation in the light transmitting resin portion molded by the primary die may deteriorate an appearance quality. That is, since the light transmitting resin portion of the front cover is molded in a curved plate shape with a substantially uniform thickness, the light transmitting resin portion is released from the restraint of the primary die when the non-light transmitting resin portion is molded by the secondary die while the molded light transmitting resin portion is held in the common die. Thus, the resin shrinkage or the resin deformation is likely to occur in the peripheral edge of the light transmitting resin portion. When the resin shrinkage or the resin deformation occurs, the peripheral edge of the light transmitting resin portion is peeled off from the cavity face of the common die so that a gap occurs between the light transmitting resin portion and the cavity face. Therefore, when the non-light transmitting resin portion is molded in this state, the molding is performed in a state where the non-light transmitting resin advances into the gap. Accordingly, in an area where a light transmitting resin has to be disposed on the surface, the non-light transmitting resin is exposed, and thus, the molding is performed such that the non-light transmitting resin extends to a part of the light transmitting resin portion. Thus, the appearance quality of the molded front cover is degraded.

An object of the present disclosure is to provide a two-color molding method capable of suppressing deterioration of an appearance quality which is caused by a resin shrinkage or a resin deformation in a previously molded resin portion. Another object of the present disclosure is to provide a two-color molded article with a high appearance quality, which is molded by the two-color molding method of the present disclosure.

According to a first aspect of the present disclosure, a two-color molding method includes: molding a first resin portion by a common die and a primary die; and molding a second resin portion integrally with the first resin portion by the common die and a secondary die. An abutting portion is molded on an edge of the first resin portion to protrude toward the secondary die when the first resin portion is molded, and a distal end surface of the abutting portion is maintained to be abutted on a cavity surface or a parting surface of the secondary die when the second resin portion is molded.

According to a second aspect of the present disclosure, a two-color molded article includes: a first resin portion; and a second resin portion molded integrally with the first resin portion. An abutting portion is provided on an edge of the first resin portion to protrude toward a surface at a side where the second resin portion is molded, and the second resin portion is not molded on a distal end surface of the abutting portion.

In the second aspect, the abutting portion may be formed as a side wall erected continuously or intermittently along the edge of the first resin portion, or as a plurality of separate projections. Here, the projection refers to a portion protruding from the surface of the first resin portion at the side where the second resin portion is molded. The two-color molded article of the second aspect may be a front cover of a vehicular lamp, the first resin portion is constituted by a light transmitting resin portion, the second resin portion is constituted by a non-light transmitting resin portion, the abutting portion is placed along a peripheral edge of the first resin portion, and the second resin portion is molded to be stacked on the peripheral edge of the first resin portion in a region inside the abutting portion. Here, the inside region refers to a region nearer to the center of the front cover than the abutting portion.

According to the first aspect of the present disclosure, when the second resin portion is molded, the abutting portion protruding on the edge of the first resin portion is abutted on the cavity surface or the parting surface of the secondary die. Thus, the edge and the abutting portion of the first resin portion are clamped between the common die and the secondary die, so that the edge and the abutting portion are suppressed from being deformed. Accordingly, when the second resin portion is molded, the deformation in the first resin portion is suppressed. Accordingly, deterioration of an appearance quality of the two-color molded article, which is caused by a shape deformation of the first resin portion, may be suppressed.

According to the second aspect of the present disclosure, the abutting portion is molded on the edge of the first resin portion. Thus, when the second resin portion is molded, the abutting portion of the first resin portion is abutted on the cavity surface or the parting surface of the secondary die. Accordingly, the edge and the abutting portion of the first resin portion are clamped between the common die and the secondary die, so that the edge and the abutting portion are suppressed from being deformed. Accordingly, deterioration of an appearance quality of the two-color molded article, which is caused by a shape deformation of the first resin portion, may be suppressed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
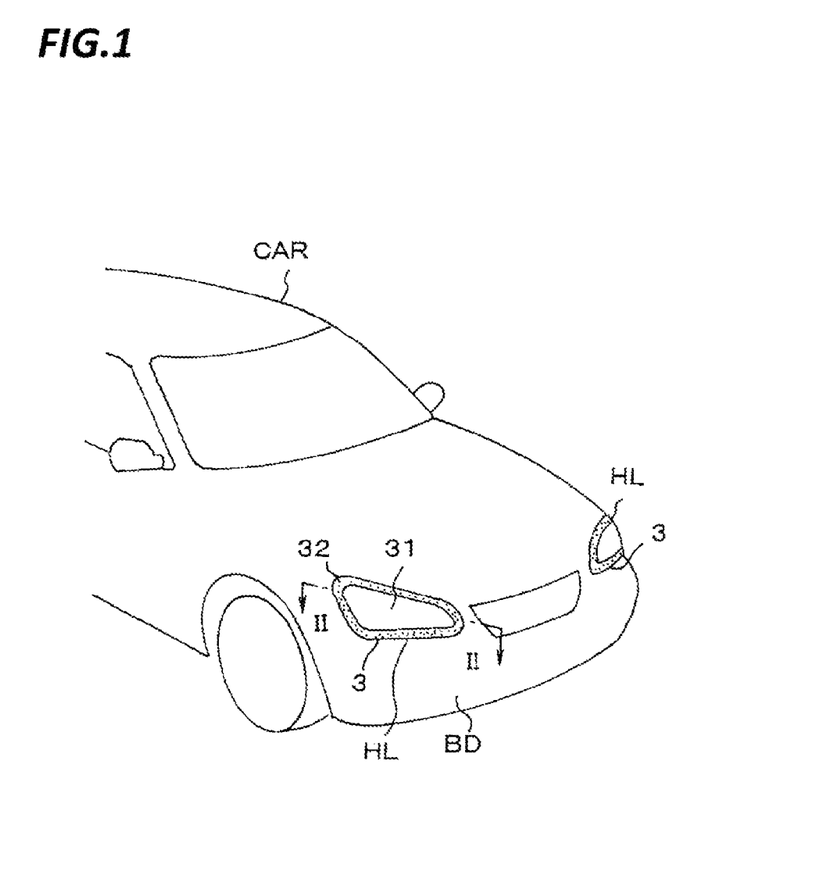
FIG. 1 is an external perspective view of a part of a vehicle equipped with a headlamp according to the present disclosure.
Figure 2:
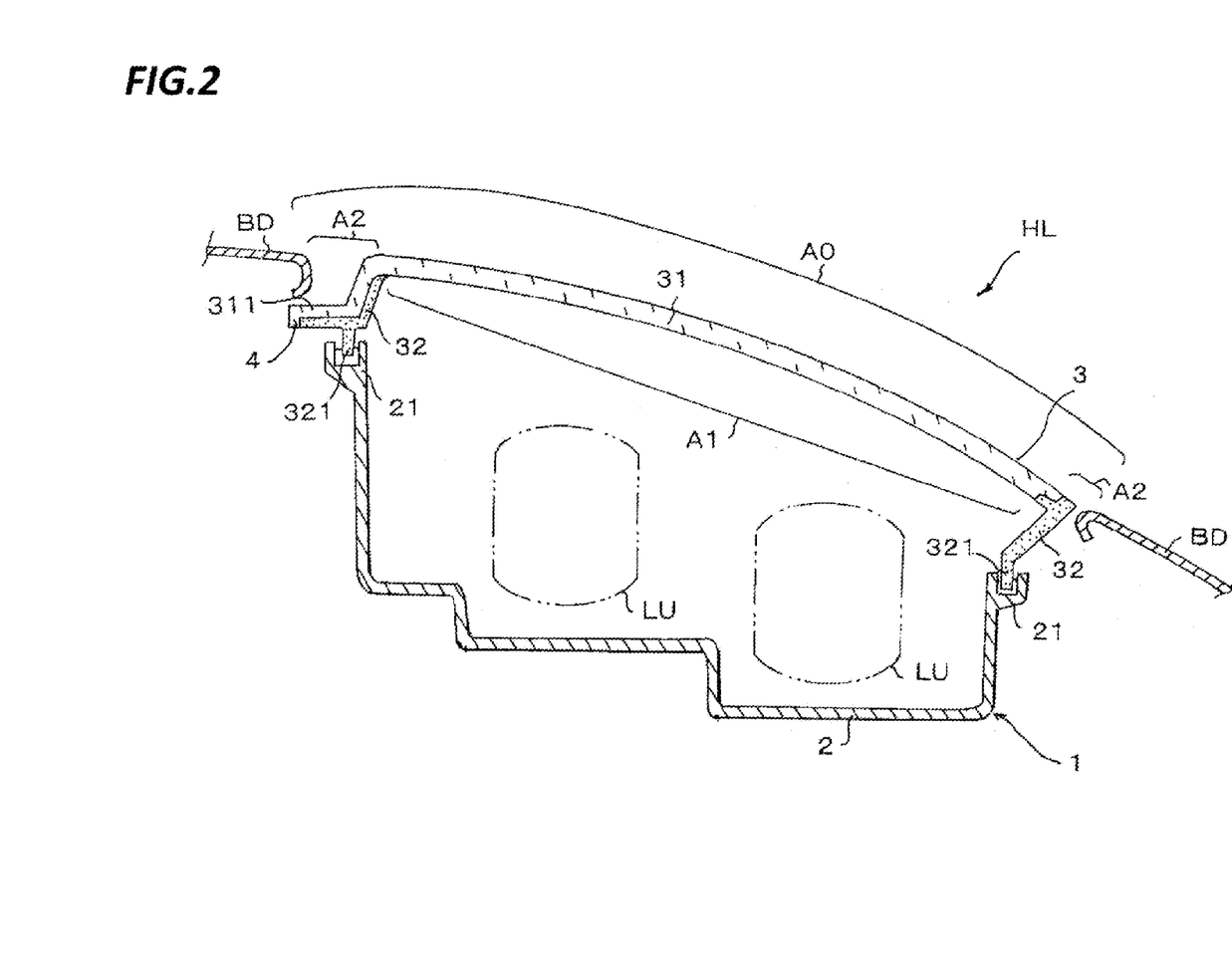
FIG. 2 is an enlarged cross-sectional view taken along line II-II in FIG. 1.

Hereinafter, an exemplary embodiment of the present disclosure will be described with reference to the accompanying drawings. FIG. 1 is an external perspective view of an exemplary embodiment, in which a two-color molded article according to the present disclosure is employed in a front cover of a headlamp disposed on a front portion of a vehicle CAR. Left and right headlamps HL are disposed on the front portion of a body BD of the vehicle CAR. FIG. 2 is an enlarged cross-sectional view taken along line II-II of the right headlamp HL in FIG. 1 in which illustration of some components is emitted. A lamp housing 1 accommodates a lamp unit LU configured to emit light to be controlled according to a required light distribution, and includes a container-type lamp body 2 having a front opening and a front cover 3 attached to the front opening of the lamp body 2. The front cover 3 is manufactured by a two-color molding method of the present disclosure.

In FIG. 2, the front cover 3 includes a light transmitting resin portion 31 and a black resin portion 32 which are integrally molded with each other. The light transmitting resin portion 31 is molded of a colorless transparent light transmitting resin, and the black resin portion 32 is molded of a black resin to be stacked in the thickness direction on a part of the light transmitting resin portion 31. The light transmitting resin portion 31 is formed in a plate shape with a substantially uniform thickness, which is curved convexly toward the front side of the lamp to be continued to a front curved surface of the body BD of the vehicle CAR. The light transmitting resin portion 31 is configured to transmit the light emitted from the lamp unit LU to irradiate the light to the front area of the vehicle CAR. The light transmitting resin portion 31 corresponds to a first resin portion of the present disclosure.

The black resin portion 32 is formed in a frame shape which extends along a part of the light transmitting resin portion 31, that is, the rear surface (directed to the rear side of the lamp) of a flange portion 311 formed in the peripheral edge of the light transmitting resin portion 31 (hereinafter, referred to as a peripheral flange portion). The black resin portion 32 corresponds to a second resin portion of the present disclosure. The black resin portion 32 is configured to function as a mounting unit for attaching the front cover 3 to the lamp body 2. The black resin portion 32 is formed to extend from the end face of the peripheral flange portion 311 of the light transmitting resin portion 31 toward the rear side (the lamp rear side), or to extend to a region which covers the rear surface (the surface directed to the lamp rear side) of the peripheral flange portion 311. A mounting portion 321 in a rib shape that extends to protrude toward the lamp rear side is molded integrally with the black resin portion 32. The mounting portion 321 is bonded to an opening edge 21 of the front opening of the lamp body 2 to constitute the lamp housing 1. In the bonding, adhesion using an adhesive or lase welding is used.

The black resin portion 32 also has a function of defining an effective portion A1 in the light transmitting resin portion 31. Through the effective portion A1, the light emitted from the lamp unit LU may be effectively transmitted to be irradiated to the front area of the vehicle. That is, the black resin portion 32 forms a shielding portion (ineffective portion) A2 which suppresses the peripheral edge region of the lamp housing 1 from being exposed to the outside of the headlamp HL. Here, a rear end 32r of the black resin portion 32 for attaching the front cover 3 to the lamp body 2 is suppressed from being exposed to the outside.

The headlamp HL having the front cover 3 is disposed on the front side of the body BD of the vehicle CAR as described above, and the front cover 3 is exposed through the opening of the body BD in the disposed state. Here, among the light transmitting resin portion 31 and the black resin portion 32 of the front cover 3, a region which is exposed to the outside without being covered by the body BD is configured as a design portion A0 of the front cover 3. In this example, a region including the effective portion A1 and a part of the inner periphery side region of the ineffective portion A2 around the effective portion A1 is configured as the design portion A0. When the design portion A0 is observed from the front side, the effective portion A1 is observed as a clear transparent surface, and the ineffective portion A2 around the effective portion A1 is observed as a clear black surface because the black resin portion 32 is observed through the light transmitting resin portion 31. Accordingly, the appearance quality of the front cover 3 or the headlamp HL may be improved. In the front cover 3, the periphery of the headlamp design surface is bordered in the dark color, and thus, the design surface has a clear appearance (eyeline effect). The structure (such as a fastening portion between a lens and a body) within the lamp is not seen. As a functional effect, light leakage prevention from the side portion of the resin cover is also achieved.

Figure 3A:
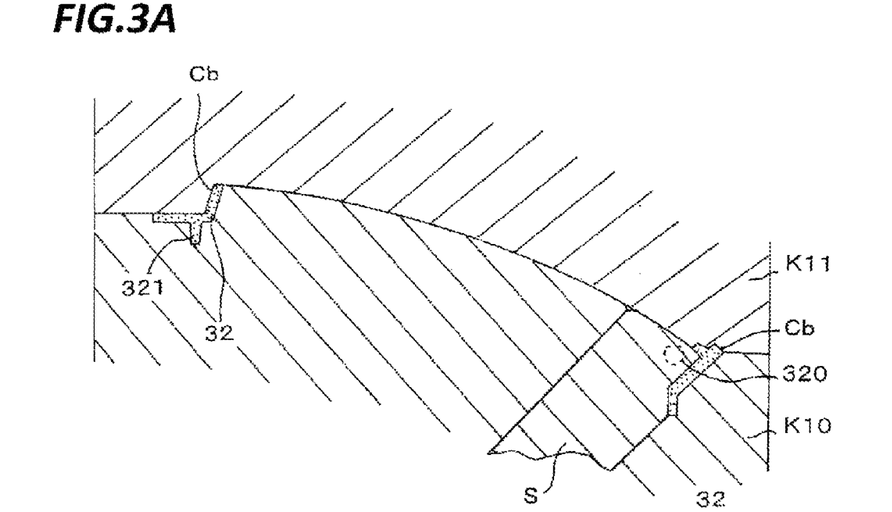
FIGS. 3A and 3B are schematic cross-sectional views illustrating a first molding method of a two-color molding method.
Figure 3B:
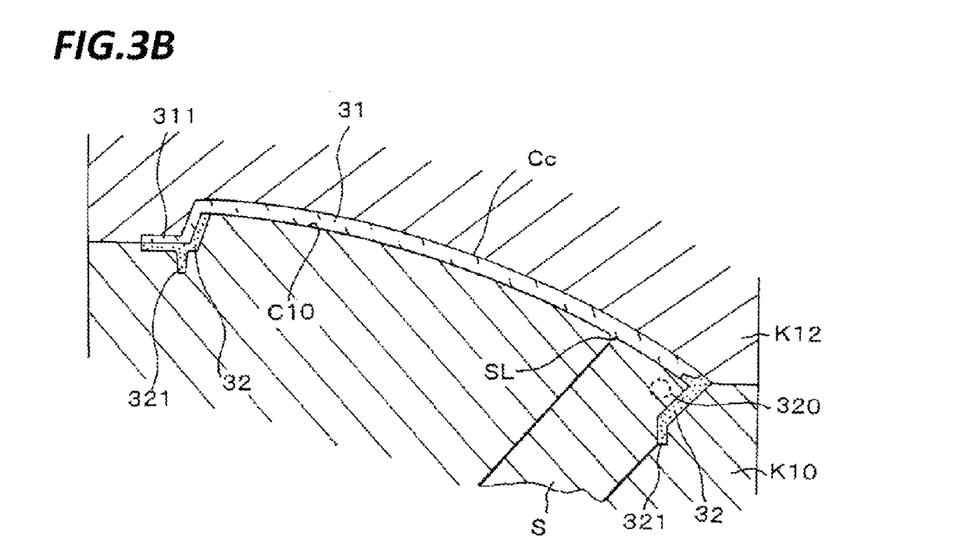

Hereinafter, a two-color molding method of the front cover will be described. FIGS. 3A and 3B are schematic cross-sectional views of a die for explaining a first molding method. First, as illustrated in FIG. 3A, a required cavity Cb is configured by a common die K10 and a primary die K11, and a black resin is injected into the cavity Cb to mold a black resin portion 32. Subsequently, as illustrated in FIG. 3B, while the molded black resin portion 32 remains in the common die K10, the primary die K11 is replaced with a secondary die K12. A new cavity Cc is configured by the common die K10 and the secondary die K12, and a light transmitting resin is injected into the cavity Cc to mold a light transmitting resin portion 31. Accordingly, the front cover 3 illustrated in FIG. 2, in which the light transmitting resin portion 31 and the black resin portion 32 are integrated with each other, is molded. A slider S is provided in the common die K10, and is used to mold an undercut portion 320 (indicated by a dashed circle) which occurs in the black resin portion 32.

In the first molding method, the slider S provided in the common die K10 is exposed in the cavity Cc configured by the common die L10 and the secondary die K12. Thus, when the light transmitting resin portion 31 is molded, a small width gap (slit) occurring in the boundary between the slider S and the common die K10 is transferred to the rear surface of the light transmitting resin portion 31 to form a so-called slide line SL. The slide line SL is observed from the front side of the light transmitting resin portion 31 because the light transmitting resin portion 31 is transparent. Thus, the appearance quality of the front cover 3 or the headlamp HL may be deteriorated.

Figure 4A:
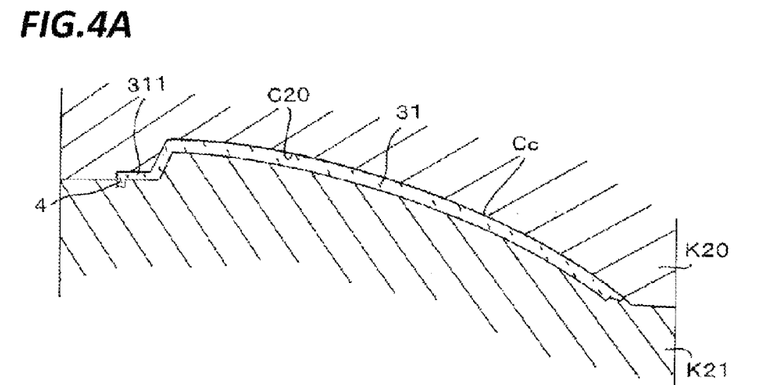
FIGS. 4A and 4B are schematic cross-sectional views illustrating a second molding method of a two-color molding method.
Figure 4B:
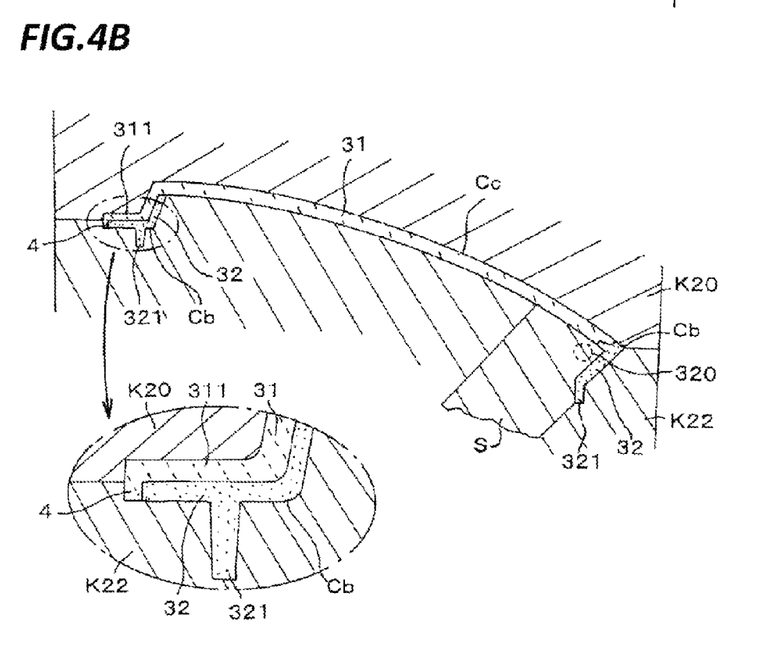

FIGS. 4A and 4B are cross-sectional views for explaining a second molding method, which are similar to FIGS. 3A and 3B. In the second molding method, first, as illustrated in FIG. 4A, a die for molding the front side of a light transmitting resin portion 31 is set as a common die K20, and a cavity Cc is configured by the common die K20 and a primary die K21 to mold a light transmitting resin portion 31. Subsequently, as illustrated in FIG. 4B, the primary die K21 is replaced with a secondary die K22 to configure a cavity Cb, and a black resin portion 32 is molded. When a slider S is provided in the secondary die K22, an undercut portion 320 which occurs in the black resin portion 32 may be molded.

When the second molding method is used for two-color molding of a front cover 3, a slide line is not formed in the light transmitting resin portion 31 because a slider is not present in the primary die K21 used for molding the light transmitting resin portion 31. Therefore, deterioration of the appearance quality by the slide line SL as in the first molding method may be suppressed.

However, in the second molding method, when the black resin portion is molded by the secondary die K22 after the light transmitting resin portion 31 is molded by the common die K20 and the primary die K21 as described above, as illustrated in FIG. 5A (an enlarged view of a peripheral flange portion 311 of the light transmitting resin portion 31), a resin shrinkage or a resin deformation occurs due to a temperature change or a time-dependent change between the moldings of the black resin portion and the light transmitting resin portion. In particular, a cavity face C20 (here and hereafter, an inner surface of a die which configures the cavity) of the common die K20 has a concave shape, and thus, is poor in molded resin retention capability as compared to a cavity face C10 of the common die K10 (see, e.g., FIG. 3B) which has a convex shape. Therefore, the shrinkage or deformation becomes significant in the peripheral flange portion 311 which is a free end of the light transmitting resin portion 31 so that the peripheral flange portion 311 is released from the state where it is in close contact with the cavity face C20 of the common die K20 and thus, a gap D occurs between the cavity face and the front surface of the peripheral flange portion 311.

Figure 5A:
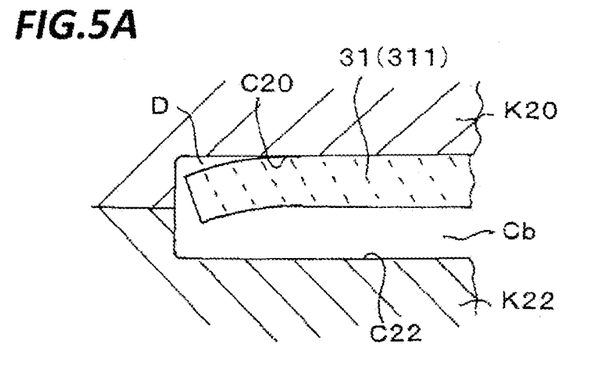
FIGS. 5A to 5C are a cross-sectional view of a part of a die for explaining problems in the second molding method, a cross-sectional view of a part of a molded front cover, and a front view of the part of the molded front cover, respectively.
Figure 5B:
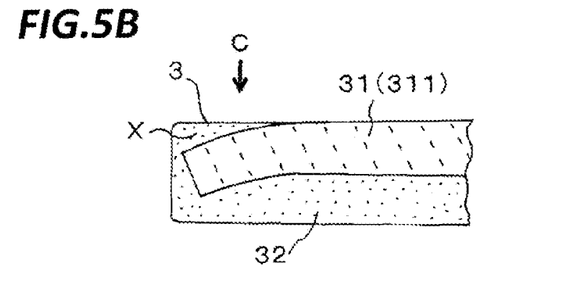
Figure 5C:
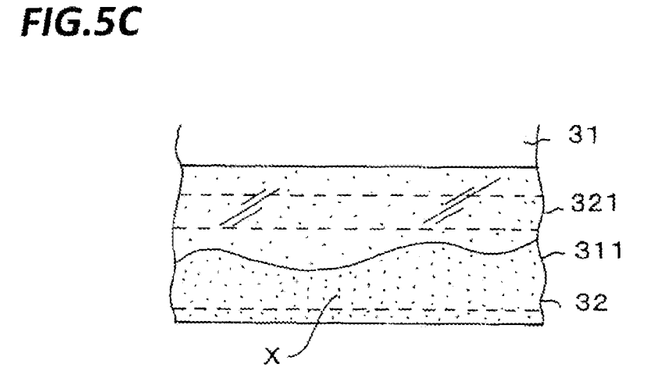

When the black resin portion 32 is molded in this state, a part of the black resin advances into the gap. Then, as illustrated in FIG. 5B and FIG. 5C, a part of the black resin portion 32 is molded as an "overlaid part" X on the front surface of the peripheral flange portion 311 of the light transmitting resin portion 31. FIG. 5B is a cross-sectional view of the molded front cover 3, and FIG. 5C is a front view taken in the direction indicated by arrow C in FIG. 5B. When the part of the black resin portion 32, as the "overlaid part" X advances to the design portion A0 of the light transmitting resin portion 31 illustrated in FIG. 2, the black resin portion 32 is observed from the front surface side of the light transmitting resin portion 31, and the appearance of the clear black surface described above is impaired. Thus, the appearance quality of the front cover 3 or the headlamp HL is degraded.

In the first molding method illustrated in FIGS. 3A and 3B, since the molded black resin portion 32 has a smaller area and a smaller volume than the light transmitting resin portion 31, an extent of the resin shrinkage or resin deformation is small after the black resin portion 32 is molded. Even if a gap occurs between the black resin portion 32 and the cavity face due to the resin shrinkage or the resin deformation, the deterioration of the appearance quality is less problematic because the light transmitting resin portion 31 advancing to the gap is transparent.

Therefore, in the present disclosure, the second molding method in which the slide line SL does not occur in the light transmitting resin portion 31 is employed, and then, an occurrence of a gap is suppressed between the light transmitting resin portion 31 and the cavity face C20 of the common die K20 so that occurrence of the "overlaid part" described above is suppressed. In order to achieve this, an abutting portion 4 is formed in the edge of the light transmitting resin portion 31, that is, the peripheral edge of the peripheral flange portion 311 to be abutted on the cavity face C22 of the secondary die K22. A part of the abutting portion 4 is illustrated in FIG. 4B in an enlarged scale and in FIG. 6A in a further enlarged scale.

Figure 6A:
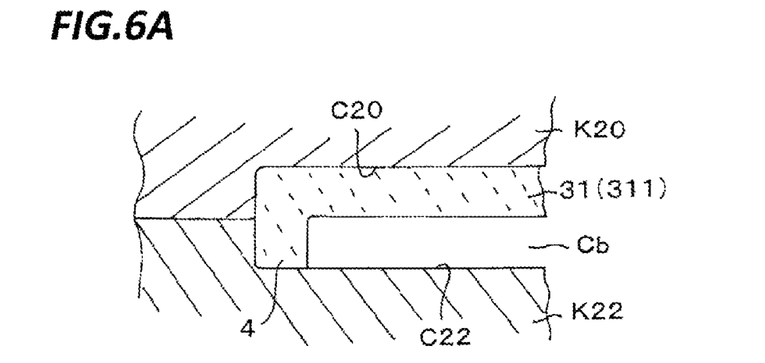
FIGS. 6A to 6C are a cross-sectional view of a part of a die for explaining the structure and operation of an abutting portion of the present disclosure, a cross-sectional view of a part of a molded front cover, and a front view of the part of the molded front cover, respectively.

That is, in the first exemplary embodiment of the present disclosure, as illustrated in FIG. 4A, when the light transmitting resin portion 31 is molded by the common die K20 and the primary die K21, the abutting portion 4 is integrally molded as illustrated in FIG. 6A. The plate thickness dimension of peripheral edge of the peripheral flange portion 311 of the light transmitting resin portion 31 is set to be larger than the plate thickness dimension of the inner region of the edge. Then, as illustrated in FIG. 4B, the common die K20 and the secondary die K22 configure the cavity Cb for molding the black resin portion 32. Here, the light transmitting resin portion 31 is held within the cavity Cb such that the distal end surface of the abutting portion 4 molded in the edge of the peripheral flange portion 311 is abutted on the cavity face C22 of the secondary die K22 to be in a close contact state, and the abutting portion 4 is clamped between the common die K20 and the secondary die K22.

Figure 7A:
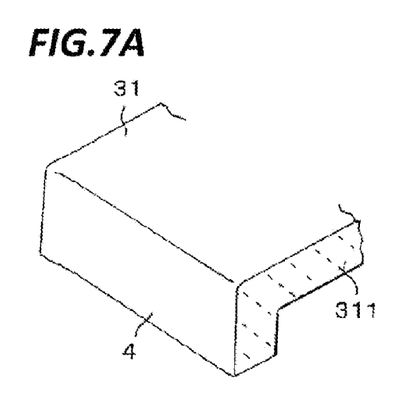
FIGS. 7A to 7D are schematic perspective views illustrating different types of abutting portions, respectively.

FIG. 7A is a partially cutaway perspective view of the peripheral flange portion 311 of the light transmitting resin portion 31 for explaining the abutting portion 4. The edge of the peripheral flange portion 311 protrudes toward the rear surface side of the front cover 3 directed downward in the drawing, and the plate thickness dimension of the protruding edge is set to be larger than the plate thickness dimension of the inner region of the edge (the region at the side directed to the center of the front cover) so that a side wall is formed to be continued to the peripheral edge of the peripheral flange portion 311. The side wall is configured as the abutting portion 4. The plate thickness dimension of the abutting portion 4 is set to be equal to the inner diameter dimension (opposed interval dimension) of the cavity Cb configured by the common die K20 and the secondary die K22 for molding the black resin portion 32, as illustrated in FIG. 6A. Accordingly, when the black resin portion 32 is molded, the distal end surface of the abutting portion 4 held within the cavity Cb is abutted on the cavity face C22 of the secondary die K22 in a close contact state.

Then, in this state, the abutting portion 4, together with the peripheral flange portion 311, is clamped between the common die K20 and the secondary die K22 while the distal end surface of the abutting portion 4 is abutted on the cavity face C22 of the secondary die K22. In particular, in the abutting portion 4, a free change of a shape is restricted by the clamping force. Thus, until the black resin portion is molded in the secondary die K22, a resin shrinkage is suppressed in the peripheral flange portion 311 of the light transmitting resin portion 31 to suppress deformation caused by the resin shrinkage. Accordingly, the occurrence of a gap is suppressed between the abutting portion 4 and the cavity face C22 of the secondary die K22. Further, a gap D illustrated in FIG. 5A is suppressed from occurring between the cavity face C20 of the common die K20 and the front surface of the light transmitting resin portion 31.

Accordingly, when the black resin is molded, the black resin does not advance to the front surface side of the peripheral flange portion 311 by being blocked by the abutting portion 4. Thus, the occurrence of the "overlaid part" X, which is a part of the black resin portion is molded on the front surface side of the peripheral flange portion 311 as illustrated in FIG. 5C, is suppressed. The deterioration of the appearance quality of the front cover 3 or the headlamp HL due to the "overlaid part" is suppressed. That is, the peripheral flange portion 311 is formed as the ineffective portion A2 by the black resin portion 32 stacked on the rear surface, while the exposed state of the front surface of the light transmitting resin portion 31, as it is, is maintained on the front surface of the peripheral flange portion 311. Thus, the clarity is obtained due to light reflection from the front surface to the same extent as the effective portion A1, thereby securing a high appearance quality.

In the front cover 3 obtained through two-color molding as described above, in the design portion A0 illustrated in FIG. 2, the central region of the light transmitting resin portion 31 whose periphery is defined by the black resin portion 32 is configured as the effective portion A1 having a light transmitting property. Thus, light emitted from the lamp unit LU is transmitted through the central region to illuminate the front area of the vehicle. On the peripheral edge of the design portion A0, the inner portion of the headlamp HL is suppressed from being exposed due to the ineffective portion A2 constituted by the black resin portion 32 formed on the rear surface of the peripheral flange portion 311 of the light transmitting resin portion 31. In the front cover 3, the periphery of the design surface of the headlamp is bordered in the dark color, and thus, the design surface has a clear appearance (eyeline effect). The structure (such as a fastening portion between a lens and a body) within the lamp is not seen. As a functional effect, light leakage prevention from the side surface of a resin cover may also be obtained.

Figure 6B:
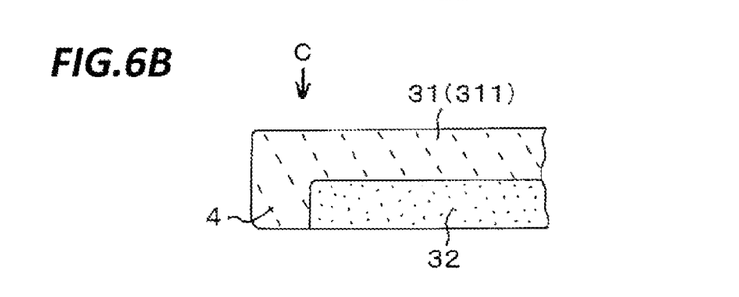
Figure 6C:
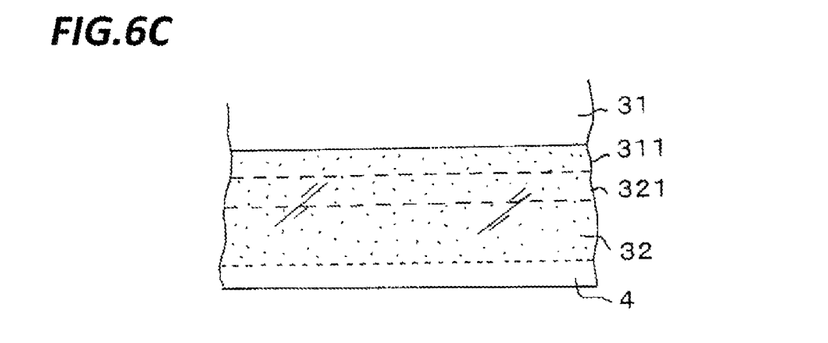

In the front cover 3 obtained through the two-color molding according to the first exemplary embodiment, as can be seen from FIG. 6B, in the peripheral flange portion 311 of the light transmitting resin portion 31, the black resin portion 32 is not molded on the distal end surface of the abutting portion 4, that is, on the rear surface position of the light transmitting resin portion 31 where the abutting portion 4 is formed. Accordingly, as illustrated in FIG. 6C which is a front view taken in a direction indicated by arrow C in FIG. 6B, when the front cover 3 is illuminated from the front side, a region in which the black resin portion 32 is not molded along the edge of the peripheral flange portion 311 is observed as a light transmitting portion. However, the light transmitting portion is a portion along the periphery of the light transmitting resin portion 31. Thus, when the light transmitting portion is set to be positioned out of the design portion A0, that is, to be covered by the body BD of the vehicle, the deterioration of the appearance quality due to the light transmitting portion may be suppressed.

Figure 7B:
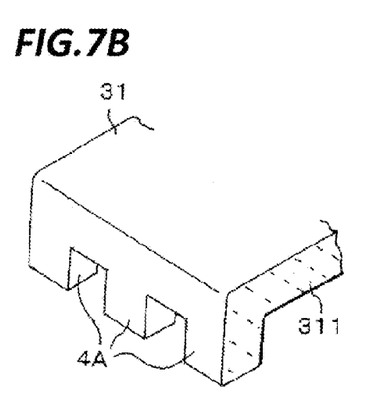

Here, as illustrated in FIG. 7B, side walls 4A intermittently formed at required size intervals along the peripheral edge of the peripheral flange portion 311 may be configured as the abutting portion 4. In a case of the side walls 4A, the black resin portion is molded while advancing to the edge of the peripheral flange portion 311 through the gap between adjacent abutting portions. As in the abutting portion 4, the distal end surfaces of the side walls 4A are abutted on the cavity face C22 of the secondary die K22 so that the side walls 4A are clamped between both the cavity faces C20 and C22 of the common die K20 and the secondary die K22. Thus, the deformation of the light transmitting resin portion 31 is suppressed when the black resin portion 32 is molded. The black resin portion 32 is also molded on the rear surface portion of the peripheral flange portion 311 where the side walls 4A are not present. At the positions of the side walls 4A, the black resin portion 32 is not molded, but light transmitting portions are formed. The light transmitting portions intermittently appear along the peripheral edge and thus, are hardly seen. Thus, the appearance quality is not deteriorated.

Figure 7C:
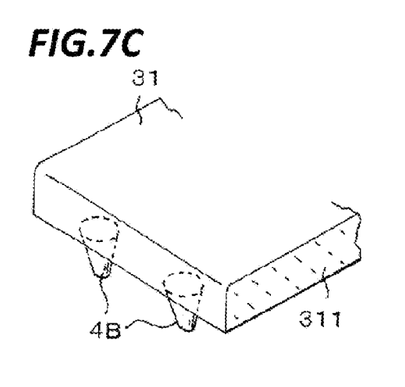
Figure 7D:
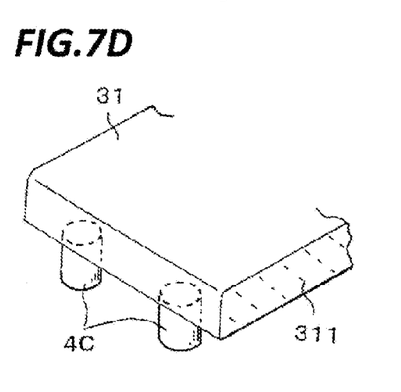

As illustrated in FIG. 7C, spindle-shaped projections 4B protruding at required size intervals along the peripheral edge on the rear surface of the peripheral flange portion 311 may be configured as the abutting portions 4. The distal ends of the projections 4B are abutted on the cavity face C22 of the secondary die K22. The projections 4B are clamped between both the cavity faces C20 and C22 of the common die K20 and the secondary die K22 so that the deformation of the light transmitting resin portion 31 is suppressed when the black resin portion 32 is molded. The black resin portion 32 is molded while advancing to the edge of the peripheral flange portion 311 through the gap between adjacent projections 4B. Light transmitting portions are present at the positions of the abutting portions 4B. However, the light transmitting portions are only point-like portions at which the distal ends of the projections 4B are abutted, and thus are hardly seen. Thus, the appearance quality is not deteriorated. As illustrated in FIG. 7D, instead of the spindle-shaped projections, columnar projections 4C may be employed.

Figure 8A:
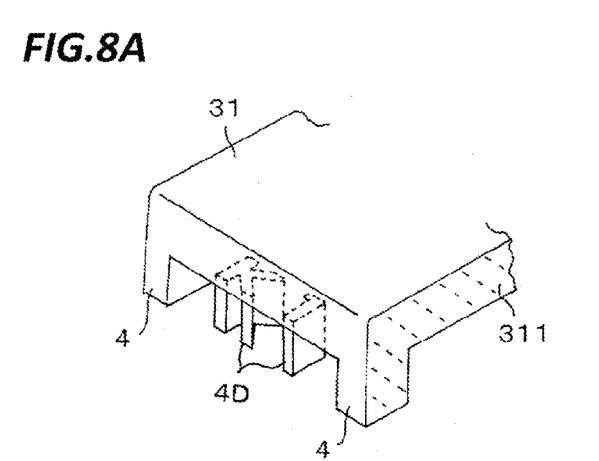
FIGS. 8A and 8B are a schematic perspective view illustrating another type of an abutting portion and a perspective view illustrating a part of a molded front cover, respectively.
Figure 8B:
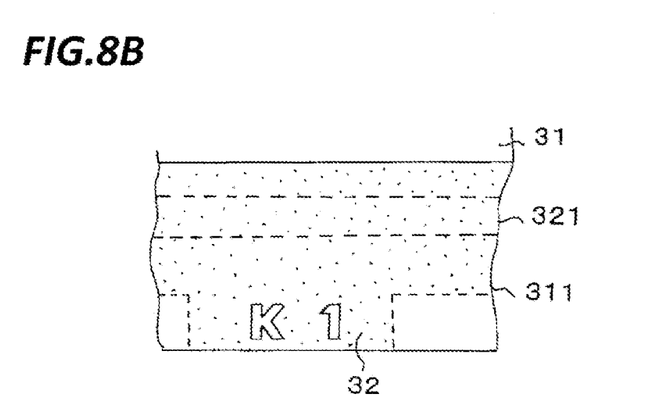

In the present disclosure, as described above, it is possible to actively use the light transmitting portions formed on a part of the black resin portion 32 by the abutting portions 4. For example, as illustrated in FIG. 8A, some of the abutting portions 4 may be formed as characters, symbols, or marks in planar shapes (when the abutting portions are viewed from the distal end side). Here, characters of "K" and "1" are formed on the distal end surfaces of projections 4D. The projections 4D may be formed on the peripheral flange portion 311 of the light transmitting resin portion 31. Then, when the black resin portion 32 is molded, light transmitting portions having the character shapes of "K" and "1" are formed in the black resin portion 32 as illustrated in FIG. 8B on the peripheral flange portion 311 of the molded front cover 3. Accordingly, when the front cover 3 is illuminated, the characters of "K" and "1" observed as the light transmitting portions may be used as identification marks for identifying the front cover 3.

Figure 9A:
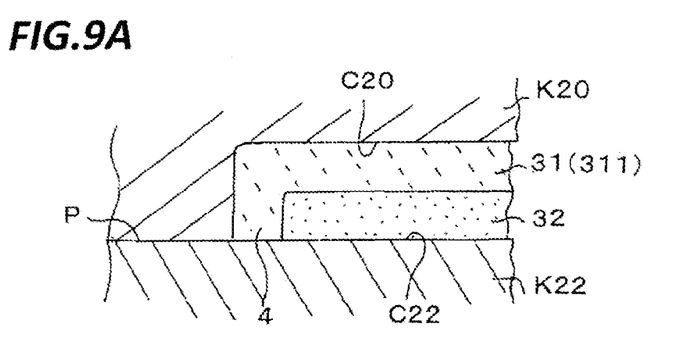
FIGS. 9A to 9C are schematic cross-sectional views illustrating modified examples of a secondary die.
Figure 9B:
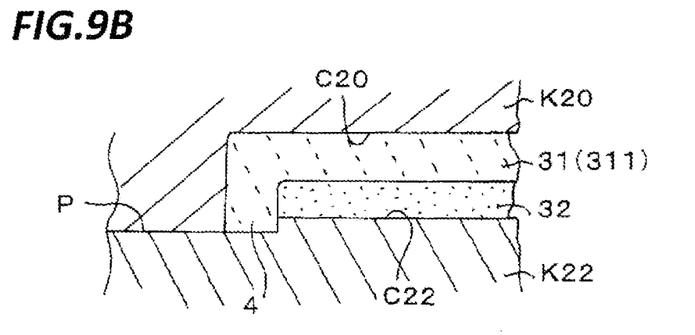
Figure 9C:
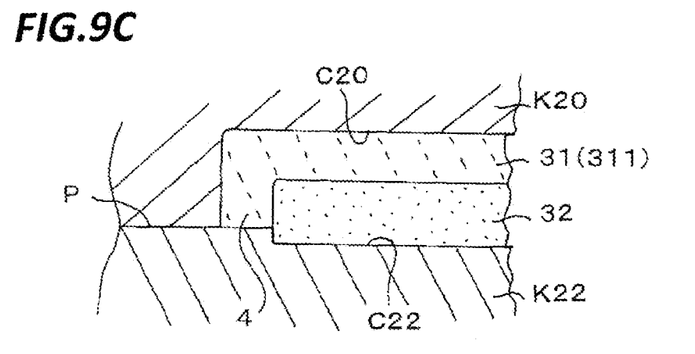

FIGS. 9A to 9C are cross-sectional views for explaining modified examples of a die to which the present disclosure is applied, when the black resin portion is molded. In the modified example, as illustrated in FIG. 7A, the abutting portion 4 is configured on the side wall having a larger plate thickness dimension than other portions, where the edge of the peripheral flange portion 311 of the light transmitting resin portion 31 protrudes to the rear surface side. The secondary die K22 is formed such that the abutting portion 4 is abutted on a surface other than the cavity, on which the common die K20 and the secondary die K22 are closely fitted to each other, that is, a parting surface. That is, in the example of FIG. 9A, in the secondary die K22, the cavity face C22 and the parting surface P are formed to be located on the same plane.

When the black resin portion is molded, the distal end surface of the abutting portion 4 is abutted on the parting surface P of the secondary die K22, and the abutting portion 4 is clamped between the common die K20 and the secondary die K22 so that the free deformation of the abutting portion 4 and the peripheral flange portion 311 is restricted. Thus, the deformation of the peripheral flange portion 311 is suppressed. Accordingly, the occurrence of a gap between the abutting portion 4 and the parting surface P may be suppressed, and the occurrence of a gap between the front surface of the peripheral flange portion 311 and the cavity face C20 of the common die K20 may also be suppressed. Accordingly, the black resin portion 32 is suppressed from advancing to the distal end surface or the outer surface of the abutting portion 4, further to the front surface side of the light transmitting resin portion 31 to be molded. The deterioration of the appearance quality of the front cover 3 or the headlamp HL due to the "overlaid part" in the light transmitting resin portion 31 is suppressed.

As illustrated in FIG. 9B, the secondary die may be configured such that the parting surface P is located at a position lower than the cavity face C22, that is, the parting surface P is recessed from the cavity face C22. In this case, the black resin portion 32 is molded with a dimension of the thickness recessed from the distal end surface of the abutting portion 4. In this case, since the distal end surface of the abutting portion 4 is abutted on the parting surface P, the black resin portion 32 is suppressed from advancing to the distal end surface or the outer surface of the abutting surface to be molded. Also, the deterioration of the appearance quality of the light transmitting resin portion due to the "overlaid part" is suppressed.

As illustrated in FIG. 9C, the secondary die may be configured such that the parting surface P is located at a position higher than the cavity face C22, that is, the parting surface P protrudes to the common die side. In this case, the black resin portion is molded with a dimension of the thickness protruding from the distal end surface of the abutting portion 4 to the rear surface side. Since the distal end surface of the abutting portion 4 is abutted on the parting surface P, the black resin portion 32 is suppressed from advancing to the distal end surface or the outer surface of the abutting portion 4 to be molded. The deterioration of the appearance quality of the front cover due to the "overlaid part" is suppressed.

In the modified examples, the abutting portion 4 may be configured as illustrated in FIGS. 7B to 7D and FIG. 8A. In any case, the distal end surface of the abutting portion 4 is abutted on the parting surface P of the secondary die K22 so that the deformation of a peripheral flange portion is suppressed, and the occurrence of a gap between the front surface of the peripheral flange portion 311 and the cavity face C20 of the common die K20 is suppressed.

In the present disclosure, the abutting portion is molded integrally with the light transmitting resin portion. Thus, the light transmitting resin portion is molded such that the height dimension of the abutting portion is equal to an interval dimension (cavity depth) between the rear surface of the light transmitting resin portion and the cavity surface or the parting surface of the secondary die. In this manner, when the black resin portion is molded, the distal end surface of the abutting portion may be securely abutted on the cavity surface or the parting surface of the secondary die, thereby securely suppressing deformation of the light transmitting resin portion. Otherwise, the height dimension of the abutting portion may be somewhat larger than the interval dimension. In this case, the distal end surface of the abutting portion may be abutted on the cavity surface or the parting surface of the secondary die with a greater force, thereby increasing the internal stress in the abutting portion and the peripheral flange portion of the light transmitting resin portion. Thus, an effect of preventing the deformation caused by the shrinkage of the resin is increased, thereby more effectively suppressing occurrence of the "overlaid part."

It is not necessary that the abutting portion is placed on the edge of the peripheral flange portion of the light transmitting resin portion. Only when the abutting portion is placed on a position displaced inward by a predetermined distance from the end, that is, an edge of a portion referred to in the present disclosure, it is possible to suppress the deformation of the peripheral flange portion.

The two-color molded article according to the present disclosure is not limited to the front cover of the headlamp, and is applicable to any resin molded article molded by the primary molding step and the secondary molding step. For example, the present disclosure may also be applicable in a case where a front cover (the front side cover of a lamp) of an indicator lamp including a rear lamp of a vehicle is molded through two-color molding. Also, the first resin portion is molded as the light transmitting resin portion, and the second resin portion is molded as the black resin portion in the exemplary embodiment described above. However, it is obvious that the first resin portion and the second resin portion are not limited to the resin in the exemplary embodiment. That is, the present disclosure is applicable in a case where, when the first resin portion and the second resin portion are sequentially molded through two-color molding, and a part of the second resin portion advances to the front surface of the first resin portion, the appearance quality of the two-color molded article may be deteriorated, for example, even in a case of two-color molding in which the first resin portion is a light color resin, and the second resin portion is a dark color resin.

The present disclosure may be employed in a two-color molding technology of sequentially and integrally molding different resins.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A two-color molding method comprising:
    molding a first resin portion by a common die and a primary die;
    molding a second resin portion integrally with the first resin portion by the common die and a secondary die provided with a slider for molding an undercut portion; and
    molding the undercut portion present in a part of the second resin portion using the slider,
    wherein an abutting portion is molded on an edge of the first resin portion to protrude toward the secondary die when the first resin portion is molded, and a distal end surface of the abutting portion is maintained to be abutted on a cavity surface or a parting surface of the secondary die and the abutting portion is maintained to be clamped between the common die and the secondary die when the second resin portion is molded, and
    the first resin portion is constituted by a light transmitting resin portion, the second resin portion is constituted by a non-light transmitting resin portion, the abutting portion is placed along a peripheral edge of the first resin portion, and the second resin portion is molded to be stacked on the peripheral edge of the first resin portion in a region inside the abutting portion.

2. The two-color molding method of claim 1, wherein the abutting portion is formed as a side wall erected continuously or intermittently along the edge of the first resin portion, or as a plurality of separate projections.

3. The two-color molding method of claim 1, wherein the second resin portion is configured as a mounting unit for attaching a front cover including the first resin portion and the second resin portion to a lamp body of a vehicular lamp.

4. The two-color molding method of claim 1, wherein a thickness of the abutting portion is set to be larger than a thickness of an inner region of the peripheral edge.

5. The two-color molding method of claim 4, wherein the thickness of the abutting portion is set to be equal to an inner diameter of a cavity configured by the common die and the secondary die for molding the second resin portion.

* * * * *